(12) United States Patent
Suzuki et al.

(10) Patent No.: US 7,292,412 B2
(45) Date of Patent: Nov. 6, 2007

(54) ROTARY HEAD DRUM APPARATUS INCLUDING A ROTARY DRUM HAVING A HEAD AND A SWITCH FOR SELECTING THE HEAD AND MAGNETIC RECORDING AND/OR REPRODUCING APPARATUS USING THE SAME

(75) Inventors: Kyoko Suzuki, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 10/765,016

(22) Filed: Jan. 26, 2004

(65) Prior Publication Data

US 2004/0190169 A1    Sep. 30, 2004

(30) Foreign Application Priority Data

Jan. 28, 2003    (JP)    ............................ P2003-019090

(51) Int. Cl.
G11B 5/52    (2006.01)
(52) U.S. Cl. .................................................. 360/281.1
(58) Field of Classification Search ...................... None
See application file for complete search history.

(56) References Cited

U.S. PATENT DOCUMENTS

| | | | |
|---|---|---|---|
| 4,364,098 A * | 12/1982 | Hirota et al. ............ | 360/281.3 |
| 4,614,985 A * | 9/1986 | Tsuruta ...................... | 360/64 |
| 4,639,805 A * | 1/1987 | Hirota et al. ............. | 360/281.3 |
| 4,742,414 A * | 5/1988 | Sakai et al. ............ | 360/130.24 |
| 4,821,132 A * | 4/1989 | Hasegawa ................ | 360/281.3 |
| 4,914,537 A * | 4/1990 | Ota .......................... | 360/281.7 |
| 4,964,006 A * | 10/1990 | Ota .......................... | 360/281.1 |
| 5,202,805 A * | 4/1993 | Sato et al. ............... | 360/281.4 |
| 6,243,240 B1 * | 6/2001 | Ozue et al. .............. | 360/281.4 |

FOREIGN PATENT DOCUMENTS

JP    2001-160201    6/2001

* cited by examiner

*Primary Examiner*—David Davis
(74) *Attorney, Agent, or Firm*—Sonnenschein Nath & Rosenthal LLP

(57) ABSTRACT

In a helical scanning type magnetic recording and/or reproducing apparatus for selecting one of output signals of two reproducing heads that are disposed at positions different by of 180° and transferring the selected output signal with a rotary transformer of one channel, a rotor side winding of a reproducing signal channel of a rotary transformer is divided into two portions. The divided portions are connected at two positions that are opposite to output terminals of head amplifiers that amplify output signals of reproducing heads and that have self short-circuit switches. Without use of extra wirings, the head amplifiers are directly connected to the rotary transformer. An output signal of the reproducing head is selected by short-circuiting a self short-circuit switch of a head amplifier corresponding to a head that does not reproduce a signal.

16 Claims, 7 Drawing Sheets

ROTARY HEAD DRUM APPARATUS INCLUDING A ROTARY DRUM HAVING A HEAD AND A SWITCH FOR SELECTING THE HEAD AND MAGNETIC RECORDING AND/OR REPRODUCING APPARATUS USING THE SAME

CROSS REFERENCE TO RELATED APPLICATION

This application claims priority from Japanese Priority Document No. 2003-019090, filed on Jan. 28, 2003 with the Japanese Patent Office, which document is hereby incorporated by reference.

BACKGROUND OF THE INVENTION

1. Field of the Invention

The present invention relates to a rotary head drum apparatus having short wirings that is able to transfer higher radio frequency signals. In addition, the present invention relates to a helical scanning type magnetic recording and/or reproducing apparatus using such rotary head drum apparatus.

2. Description of Related Art

A conventional rotary head drum apparatus that is used for a magnetic recording and/or reproducing apparatus of helical scanning type has a pair of recording heads and a pair of reproducing heads, wherein each pair of recording heads and reproducing heads are disposed at positions different by 180° on a rotary drum, respectively. A recording signal and a reproducing signal are transferred through a rotary transformer (for example, see Japanese Patent Laid-Open Publication No. 2001-160201).

The magnetic recording and/or reproducing apparatus disclosed in the above mentioned Publication has a Read After Write (RAW) function while reproducing recorded information from a tape shaped recording medium so as to check whether or not the information is correctly recorded thereto when recording the information thereto. To accomplish the RAW function, the rotary transformer has a recording signal channel and a reproducing signal channel for supplying recording signals to the recording heads and for deriving reproducing signals from the reproducing heads, respectively.

Next, a signal transferring portion of the magnetic recording and/or reproducing apparatus will be described. As shown in FIG. 1, a pair of a recording head 4A and a reproducing head 5A and a pair of recording head 4B and a reproducing head 5B are disposed at positions different by 180° on a rotary drum. As shown in FIG. 4, whenever the rotary drum rotates by 180°, the pair of the recording signal channel ch A and the reproducing signal channel ch A and the pair of the recording signal channel ch B and the reproducing signal channel ch B alternately operates.

In FIG. 9, the rotary transformer is designated by reference numeral 7. The rotary transformer 7 transfers (supplies and receives) signals of individual channels. The rotary transformer 7 has recording signal channels 8a and 8b for supplying recording signals to the recording heads 4A and 4B, reproducing signal channels 9a and 9b for receiving signals from the reproducing heads 5A and 5B, a power supply channel 10 for supplying a power to head amplifiers, and short-circuit rings 11 and 11 as shield channels for preventing a cross talk of the power supplying channel 10 from taking place in other signal channels. Each of the channels 8a, 8b, 9a, 9b, 10 and the short-circuit rings 11 and 11 (of the rotary transformer 7) is composed of rotor side coils 8ar, 8br, 9ar, 9br, 10r, and 11r and stator side coils 8as, 8bs, 9as, 9bs, 10s, and 11s. The rotor side coils and the stator side coils of each of the channels and short-circuit rings are disposed in coaxially formed ring-shaped grooves.

The signal transferring portion is structured as shown in FIG. 8. Recording signals are transferred from recording amplifiers 19a and 19b to the recording heads 4A and 4B through the recording signal channels 8a and 8b, respectively. Reproducing signals are transferred from the reproducing heads 5A and 5B to reproducing amplifiers 17a and 17b through head amplifiers 16a and 16b and the reproducing signal channel 9a and 9b, respectively. An operating power is transferred from a power supply amplifier 12 to the head amplifiers 16a and 16b through the power supply channel 10, a rectifying and smoothing circuit 14 and a regulator 15 disposed on the rotor.

The magnetic recording and/or reproducing apparatus has two recording heads and two reproducing heads. However, there is a magnetic recording and/or reproducing apparatus of multiple channel type that has more than two channels (for example, see Japanese Patent Examined Publication No. Hei 8-34025).

The magnetic recording and/or reproducing apparatus of multiple channel type disclosed in the above mentioned Publication has a plurality of reproducing heads arranged with pitches narrower than the widths of tracks. These reproducing heads reproduce signals from recorded tracks. A reproducing signal process circuit of the magnetic recording and/or reproducing apparatus processes the reproducing signals reproduced by the reproducing heads so as to generate reproducing signals that are free from tracking errors and so forth.

In recent years, the signal transfer frequencies of magnetic recording and/or reproducing apparatuses are becoming as high as several 100 MHz. In addition, their rotary drums are becoming miniaturized (for example as small as 18 mmφ).

As shown in FIG. 10, in order to decrease the number of channels of rotary transformer of the reproducing portion, one of output signals of the head amplifiers 16a and 16b that amplify reproduced signals from the reproducing heads 5A and 5B is selected by a switch 20 at timings of switching pulse signal shown in FIG. 4. The selected output signal is supplied to a reproducing amplifier 17 through one reproducing signal channel 9. In this example, the wirings of the reproducing portion on the rotor side of the rotary drum are structured as shown in FIG. 12 to FIG. 14.

Likewise, in order to decrease the number of channels rotary transformer of the recording portion, as shown in FIG. 11, the recording heads 4A and 4B are connected in series to one recording signal channel 8. In addition, head switches SW1a and SW1b that are turned off upon recording are connected to the recording heads 4A and 4B, respectively. Two recording signals A and B are transferred from a single recording amplifier 19 to the recording heads 4A and 4B, respectively, through one recording signal channel 8 (for example, see Japanese Patent Laid-Open Publication No. Hei 11-273183).

The wirings of the reproducing portion on the rotor side of the rotary drum shown in FIG. 12 are structured as follows. A wiring board 21 that has the head amplifiers 16a and 16b and a switch 20 are disposed between the reproducing head 5B and a lead wire portion of a rotor side coil 9r in the reproducing signal channel 9 of the rotary transformer 7. The reproducing heads 5A and 5B and the head amplifiers 16a and 16b are connected with wirings 23 and 24, respectively. A switch 20 is connected to a lead wire 22 of the coil 9r on the rotor side. In this example, since the wiring board 21 is disposed adjacent to the reproducing head 5B, the wiring 23 connected between the reproducing head 5A and the head amplifier 16a adversely becomes longer.

The wirings shown in FIG. 13 are structured in the manner that a lead wire portion of the coil 9r on the rotor side in the reproducing signal channel 9 of the rotary transformer 7 is disposed in a direction perpendicular to the reproducing heads 5A and 5B. The head amplifiers 16a and 16b and a lead wire 22 of the coil 9r on the rotor side are connected with wiring 23 and 24, respectively. The wirings shown in FIG. 14 are structured in the manner that a lead wire portion of the coil 9r on the rotor side in the reproducing signal channel 9 of the rotary transformer 7, the head amplifiers 16a and 16b, and a wiring board having a switch 20 are disposed in a direction perpendicular to the reproducing heads 5A and 5B. The reproducing heads 5A and 5B and the head amplifiers 16a and 16b are connected with wiring 23 and 24, respectively. A lead wire 22 of the coil 9r on the rotor side is connected to the switch 20. In the examples shown in FIG. 13 and FIG. 14, the length of the wiring 23 is the same as the length of the wiring 24. However, the total length of the wirings 23 and 24 shown in FIG. 13 and FIG. 14 is the same as that shown in FIG. 12.

Thus, with the wirings as shown in FIG. 12 to FIG. 14, 1) since the head amplifiers 16a and 16b, the rectifying and smoothing circuit 14, the regulator 15, and so forth are disposed along with the recording heads 4A and 4B and the reproducing heads 5A and 5B on the rotor side of the rotary drum, it is difficult to provide a space for the wiring board for a small diameter rotary drum of multiple channel type, 2) since the wirings become long, they result in inductance and capacity that prevent radio frequency signals from being transferred, and 3) since reproduced output signals are connected in series, even if the number of channels of the rotary transformer is decreased, noises of heads from which signals are not reproduced and amplifiers thereof adversely affect signals. As a result, the SNR (signal to noise ratio) becomes worse.

To solve the foregoing problem, what is needed is a rotary head drum apparatus for allowing wirings on the rotor side to become shorter. In addition, what is needed is a magnetic recording and/or reproducing apparatus of multiple channel helical scanning type using the rotary head drum apparatus.

SUMMARY OF THE INVENTION

An aspect of the present invention is a rotary head drum apparatus, comprising: two heads oppositely disposed at two positions different by 180° on a rotary drum; switches for selecting one of the two heads; and a rotary transformer of one channel for transferring the selected signal, wherein the rotary transformer has a rotor side winding divided into two winding portions that are opposite to the two heads.

Another aspect of the present invention is a magnetic recording and/or reproducing apparatus of helical scan type for recording and/or reproducing signals, the magnetic recording and/or reproducing apparatus having a rotary head drum apparatus comprises: two heads oppositely disposed at two positions different by 180° on a rotary drum; switches for selecting one of the two heads; and a rotary transformer of one channel for transferring the selected signal, wherein the rotary transformer has a rotor side winding divided into two winding portions that are opposite to the two heads.

According to the present invention:

1. Wirings on the rotor side of the drum can be omitted.

(A) A wiring board can be easily mounted and multiple channels can be provided.

(B) There are no extra wirings exposed to noises. Thus, the signal quality does not deteriorate. As a result, the error rate can be improved.

(C) There are no wirings that result in inductance and capacitance. Thus, higher radio frequency signals can be transferred.

2. The number of channels of the rotary transformer can be decreased.

(A) Thus, the cost of the rotary transformer can be reduced.

(B) Thus, since cross-talk can be easily prevented and coupling characteristic can be easily improved, the performance of the rotary transformer can be secured.

3. Since radio frequency signals can be transferred on multiple channels, a magnetic recording and/or reproducing apparatus of high transfer rate and helical scan type can be accomplished.

BRIEF DESCRIPTION OF THE DRAWINGS

These and other objects, features and advantages of the present invention will become more apparent in light of the following detailed description of a best mode embodiment thereof, as illustrated in the accompanying drawings, wherein.

DESCRIPTION OF THE PREFERRED EMBODIMENT

Next, with reference to the accompanying drawings, a magnetic recording and/or reproducing apparatus according to, an embodiment of the present invention will be described. The magnetic recording and/or reproducing apparatus according to the embodiment is directed to a magnetic tape streamer drive apparatus, which is known as a data recording and/or reproducing apparatus for use with a computer. The magnetic tape streamer drive apparatus has so-called RAW (Read after Write) function for reproducing information from a tape shaped recording medium while recording the information thereon and checking whether or not the information has been correctly recorded. To accomplish the RAW function, the magnetic tape streamer drive apparatus has a recording head and a reproducing head on a rotary drum. In addition, to send a signal to the recording head, and receive a signal from the reproducing head, a rotary transformer of the magnetic tape streamer drive apparatus has a recording signal channel and a reproducing signal channel.

Figure 1:
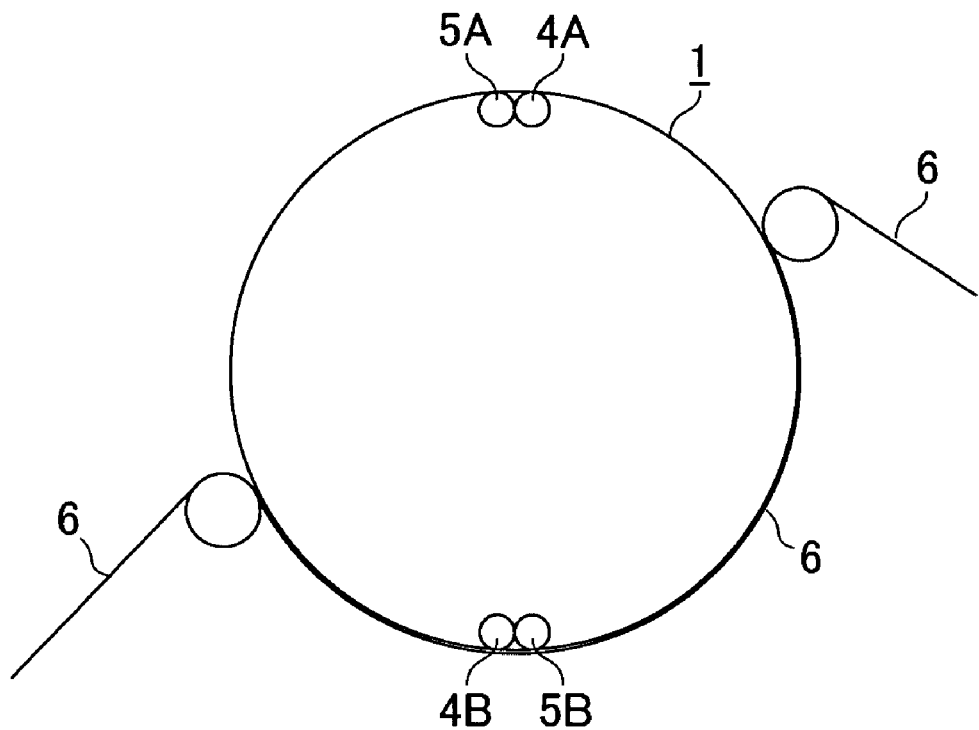
FIG. 1 is a plan view showing an outline of a rotor side rotary head drum apparatus according to an embodiment of the present invention.
Figure 2:
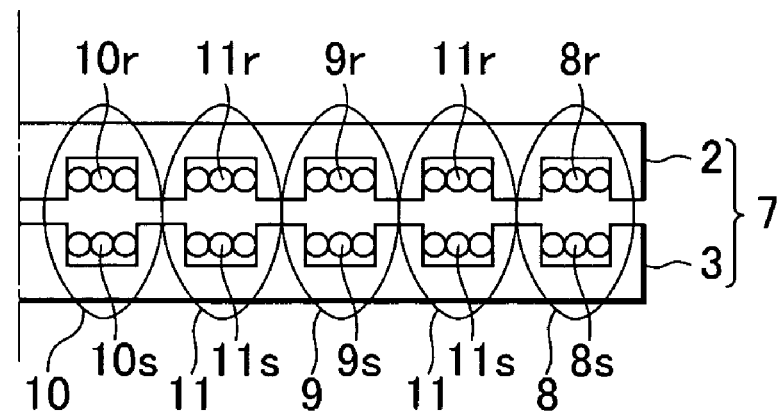
FIG. 2 is a sectional view showing an outline of a rotary transformer according to the embodiment of the present invention.
Figure 3:
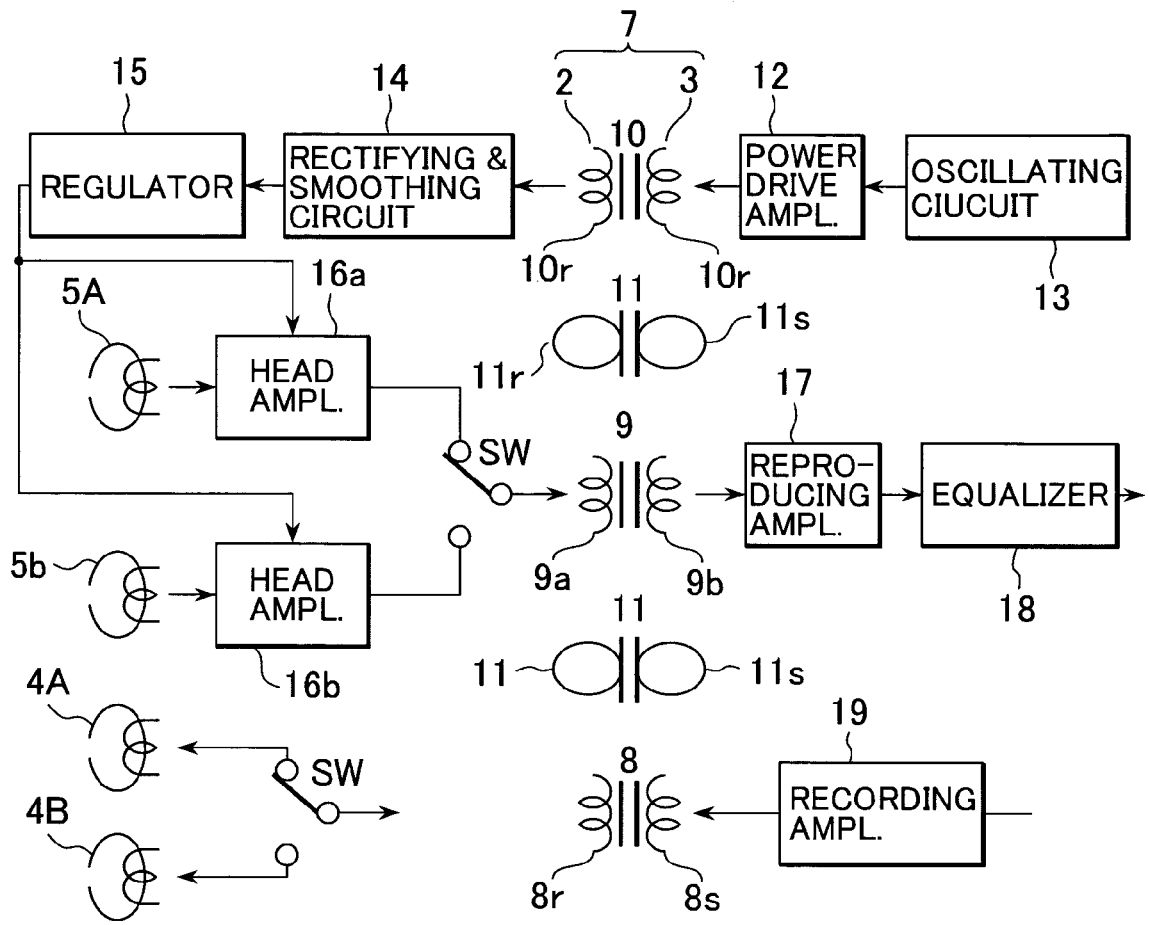
FIG. 3 is a block circuit diagram showing an outline of a signal transferring portion according to the embodiment of the present invention.
Figure 4:
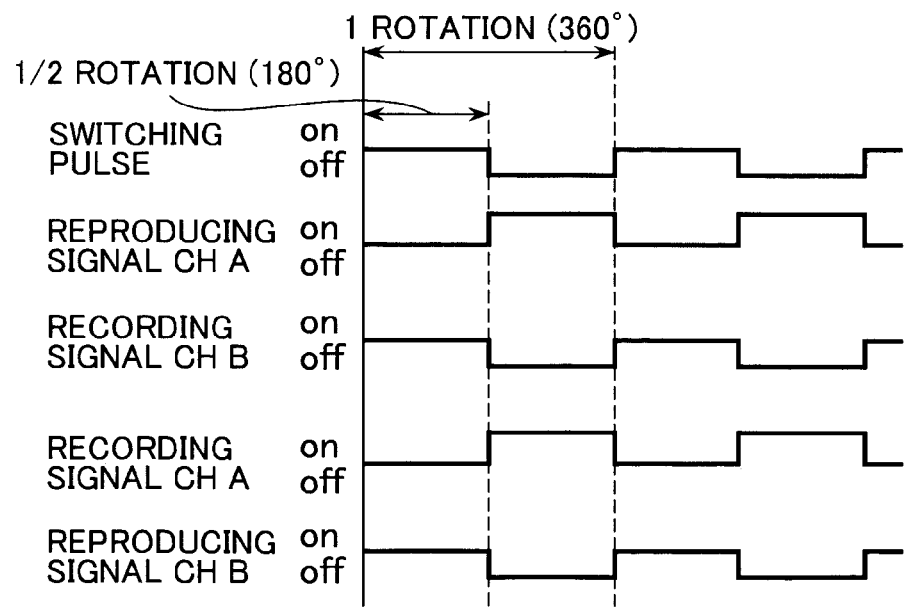
FIG. 4 is a timing chart showing an operating state of each channel.

FIG. 1 is a schematic plane view describing the relation of the positions of the heads. FIG. 2 is a sectional view showing an outline of a rotary transformer. FIG. 3 is a circuit diagram showing an outline of a signal transferring portion of a rotary drum. FIG. 4 is a timing chart showing an operating state of each channel. As shown in FIG. 1, the rotary head drum apparatus has two recording heads 4A and 4B and two reproducing heads 5A and 5B. The recording heads 4A and 4B are disposed at positions whose center angles are different by 180°. Likewise, the reproducing heads 5A and 5B are disposed at positions whose center angles are different by 180°. The recording head 4A has azimuth angle A. The recording head 4B has azimuth angle B. The reproducing head 5A has azimuth angle A. The reproducing head 5B has azimuth angle B.

The heads 4A and 4B or 5A and 5B that are in contact with a magnetic tape 6 are selected by switching. Signals of corresponding channels of the rotary transformer 7 are transferred.

The magnetic tape 6 is wound askew around the rotary head drum apparatus 1 at an angle of 180° or more thereto. Thus, the heads 4A and 4B form record tracks Ta and Tb skewed at a predetermined angle. In addition, the record track Ta having the azimuth angle A and the record track Tb having the azimuth angle B are adjacently formed. The azimuth angles A and B may be 0 degree or equal (A=B).

The rotary transformer 7 (see FIG. 2) has a recording signal channel 8, a reproducing signal channel 9, a power supply channel 10 for supplying a power to a reproducing head amplifier 16 (see FIG. 3), and short-circuit rings 11 and 11 as shield channels for preventing cross-talk among channels.

Figure 5:
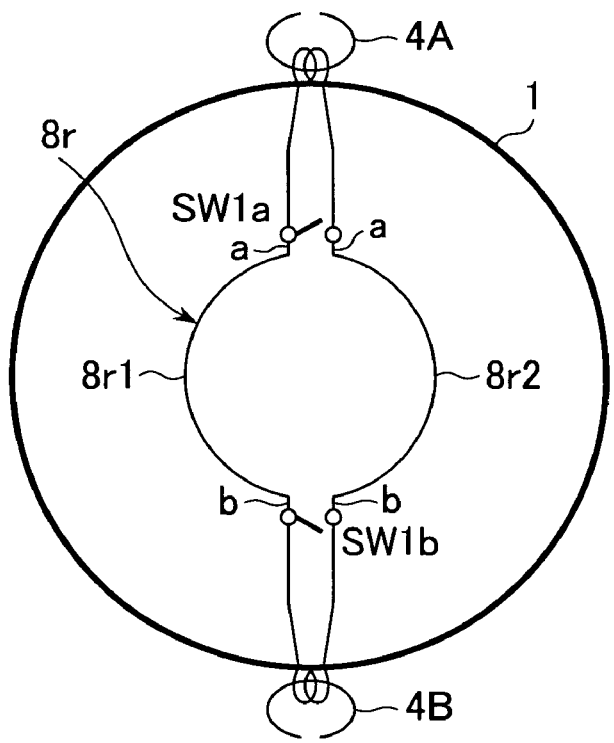
FIG. 5 is a wiring diagram showing an outline of a recording portion on a rotor side of a drum according to the embodiment of the present invention.
Figure 6:
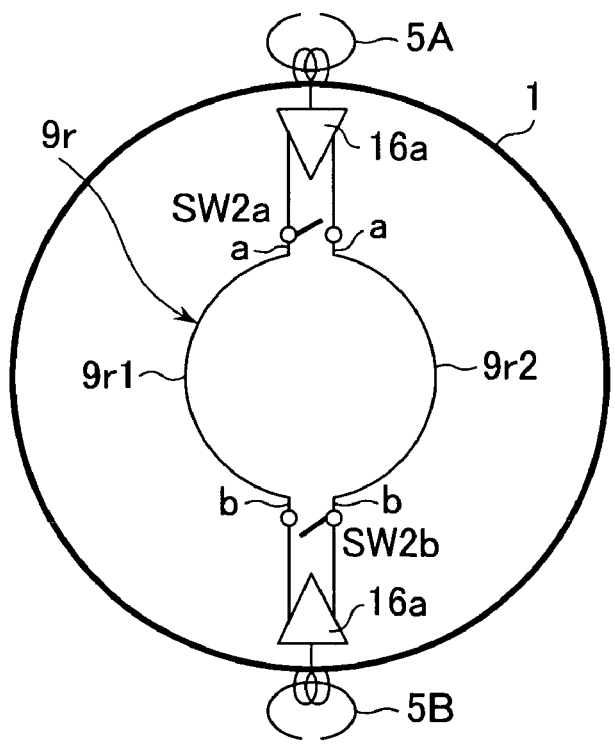
FIG. 6 is a wiring diagram showing an outline of a reproducing portion on the rotor side of the drum according to the embodiment of the present invention.

Each of the channels 8, 9, and 10 of the rotary transformer 7 is composed of a rotor side coil with subscript r and a stator side coil with subscript s. The rotor side coil and the stator side coil of each channel are ring shaped coils disposed in ring shaped grooves opposed to each other. The channels 8, 9, 10, 11, and 11 are arranged as shown in FIG. 2. However, as shown in FIG. 5, the rotor side coil 8r of the channel 8 is wound in the manner that the rotor side coil 8r is divided into half turn windings 8r1 and 8r2 having two pairs of lead wires a and b disposed at two positions opposite to the recording heads 4A and 4B. Likewise, as shown in FIG. 6, the rotor side coil 9r of the channel portion 9 is wound in the manner that the rotor side coil 9r is divided into half turn windings 9r1 and 9r2 having two pairs of lead wires a and b placed at two positions opposite to the reproducing heads 5A and 5B.

As shown in FIG. 3, a stator side coil 10s of the power supply channel 10 of the rotary transformer 7 is connected to a power drive amplifier 12 and an oscillating circuit 13. A power signal is transferred from the power drive amplifier 12 to the rectifying and smoothing circuit 14 on the rotor side through the power supply channel 10. The power signal is rectified and smoothened by the rectifying and smoothing circuit 14. The resultant signal is supplied as a power supply of amplifiers 16a and 16b of the reproducing heads 5A and 5B that have self short-circuit switches through a regulator 15.

As shown in FIG. 5, the recording heads 4A and 4B are directly connected to the lead wires a and b of the divided windings 8r1 and 8r2 on the rotor side of the recording signal channel portion 8 of the rotary transformer 7 without use of extract wirings. In addition, the recording heads 4A and 4B are connected in parallel to switches SW1a and SW1b that are turned on or off every half turn (180°) of the rotary drum and alternately short-circuit the recording heads 4A or 4B.

A recording amplifier 19 is disposed on the stator side. The recording amplifier 19 alternately outputs a recording signal A or B at timings of the recording signal ch A and ch B shown in FIG. 4. These recording signals A and B are transferred to the recording heads 4A and 4B that are connected in series through the recording signal channel 8 of the rotary transformer 7. The switch SW1a is turned off while the recording signal A is present for a 180° turn of the rotary head drum apparatus. In contrast, the switch SW1b is turned off while the recording signal B is present for a 180° turn of the rotary head drum apparatus 1. The recording signals A and B are transferred to the recording heads 4A and 4B, respectively.

As shown in FIG. 6, the reproducing heads 5A and 5B are connected to the lead wires a and b of the divided windings 9r1 and 9r2 on the rotor side of the reproducing signal channel 9 of the rotary transformer 7 through the head amplifiers 16a and 16b having self short-circuit switches SW2a and SW2b, respectively, without use of extract wirings.

The self short-circuit switches SW2a and SW2b of the head amplifiers 16a and 16b are turned off for which the reproducing heads 5A and 5B output reproducing signals for a 180° turn of the rotary head drum apparatus 1. Thus, the reproducing signals that are alternately output from reproducing heads 5A and 5B every 180° turn of the rotary drum are amplified by the head amplifiers 16a and 16b, respectively, and transferred to the reproducing amplifier 17 through the reproduction channel 9 of the rotary transformer 7.

Next, the operations of the channels 8 and 9 will be described. The recording heads 4A and 4B are circumferentially disposed at positions whose center angles are different by 180° on the rotary head drum apparatus 1. Thus, while the recording head 4A or 4B is contacting the magnetic tape 6, the recording amplifier 19 alternately outputs the recording signals A and B at timings of the recording signal ch A and the recording signal ch B based on the switching pulse shown in FIG. 4. These recording signals A and B are transferred to the recording heads 4A and 4B through the recording signal channel 8 of the rotary transformer 7.

With respect to the switches SW1a and SW1b connected to the recording heads 4A and 4B, respectively, the switch SW1a or SW1b of the recording head 4A or 4B that is contacting the magnetic tape 6 is turned off. In contrast, the switch SW1b or SW1a of the recording head 4B or 4A that is not contacting the magnetic tape 6 is turned on. Thus, the recording signals A and B can be transferred to the recording heads 4A and 4B without influences of the recording heads 4B and 4A, respectively.

The lead wires a and b of the divided windings 8r1 and 8r2 on the rotor side of the recording signal channel 8 are directly connected to the recording heads 4B and 4A, respectively, without use of extract wirings. Thus, since there are no extract wirings that result in noises and capacitance, radio frequency signal transfer characteristic is improved.

As another embodiment of the present invention, the switches SW1a and SW1b for recording channel may be omitted from the rotary head drum apparatus 1.

Likewise, since the reproducing heads 5A and 5B are circumferentially disposed at positions whose center angles are different by 180° on the rotary head drum apparatus 1, while the reproducing head 5A or 5B is contacting the magnetic tape 6, the reproducing heads 5A and 5B alternately output reproducing signals A and B at timings of reproducing signal ch A and ch B, respectively shown in FIG. 4. These reproducing head signals A and B are amplified by the head amplifiers 16a and 16b, respectively. The self short-circuit switch SW2a or SW2b of the head amplifier 16a or 16b is turned off while the reproducing head 5A or 5B is contacting the magnetic tape 6, respectively. While the reproducing head 5A or 5B is not contacting the magnetic tape 6, the self short-circuit switch SW2a or SW2b is turned on, respectively. Thus, the reproducing signal A or B that is amplified by the head amplifier 16a or 16b are transferred to the reproducing amplifier 17 through the reproducing signal channel 9 without influences of the head amplifiers 16b and 16a, respectively. The reproducing signal A or B is output to the signal process circuit through the reproducing amplifier 17 and an equalizer 18. The signal process circuit checks whether or not the reproducing signal A or B is correctly recorded. In other words, the single reproducing signal channel 9 allows the two reproducing signals A and B to be transferred to the reproducing amplifier 17.

The reproducing heads 5A and 5B are connected to the lead wires a and b of the divided windings 9r1 and 9r2 on the rotor side of the reproducing signal channel 9 through the head amplifiers 16a and 16b without use of extra wirings. Thus, since there are no extract wirings that result in noises and capacitance, radio frequency signal transfer characteristic is improved.

Figure 7:
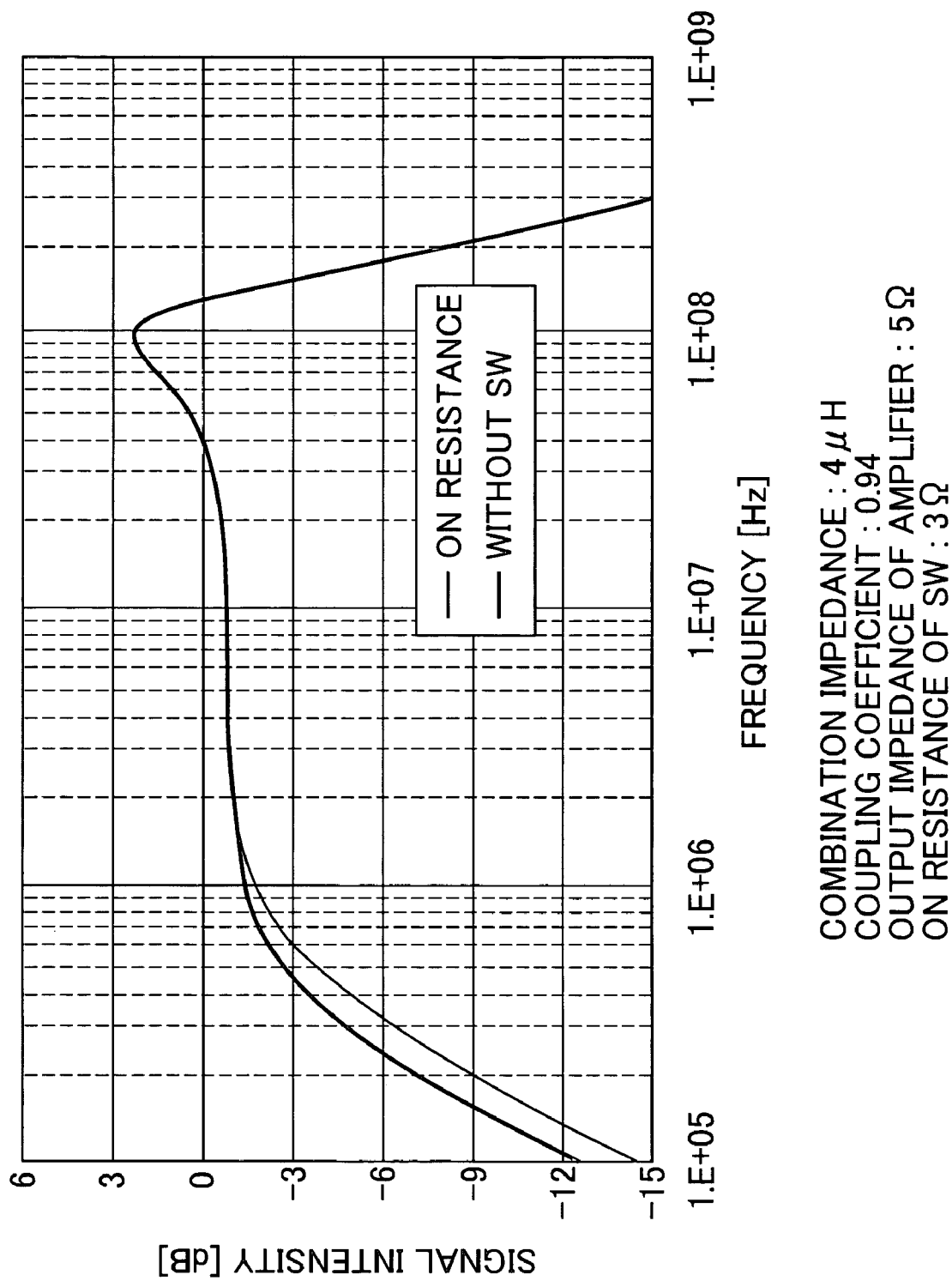
FIG. 7 is a graph showing a signal transferring characteristic of the reproducing portion.
Figure 8:
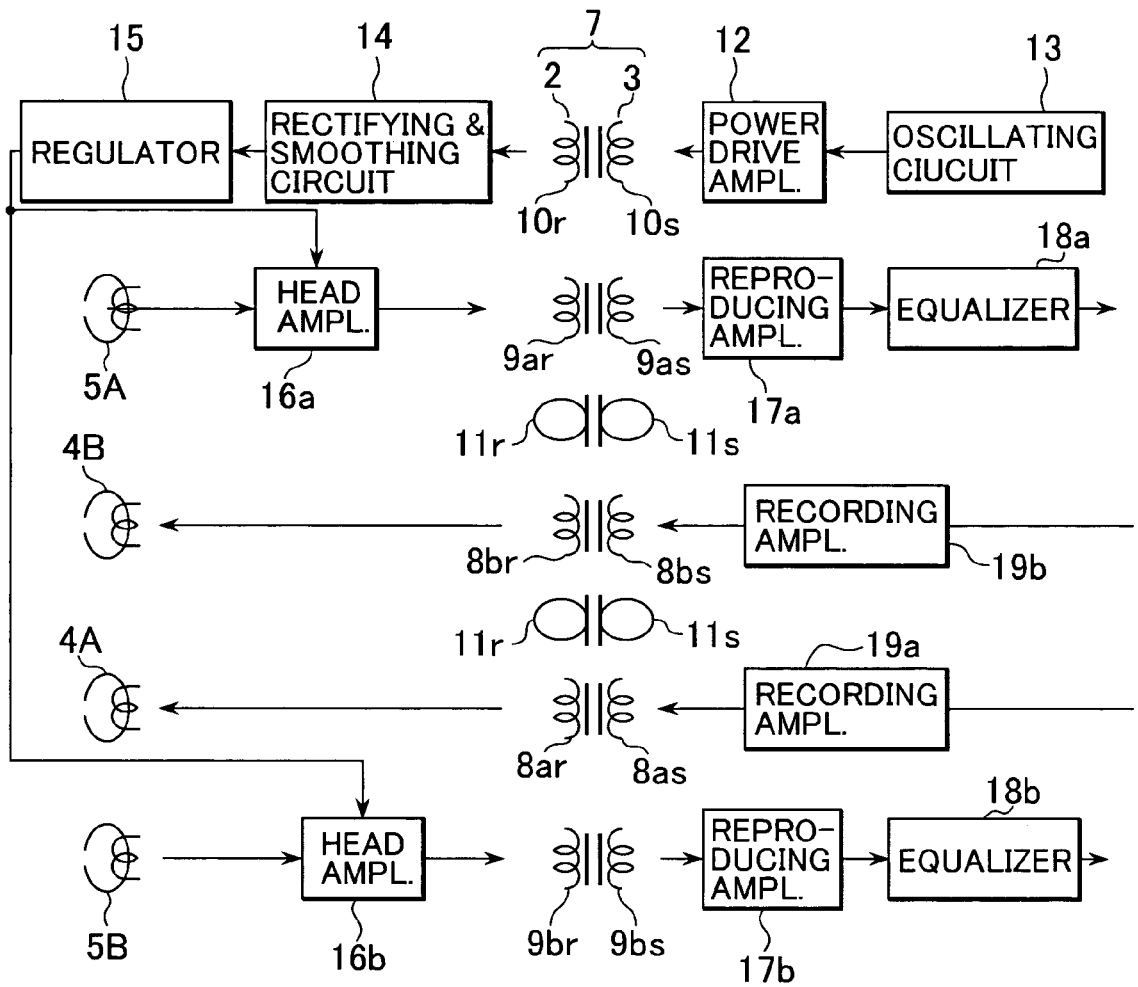
FIG. 8 is a block circuit diagram showing a conventional signal transferring portion.
Figure 9:
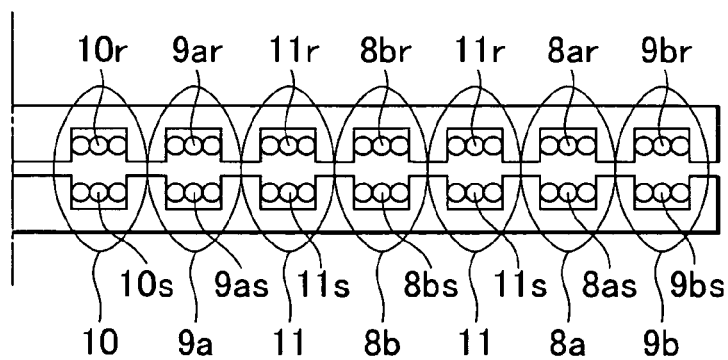
FIG. 9 is a sectional view showing an outline of a conventional rotary transformer.
Figure 10:
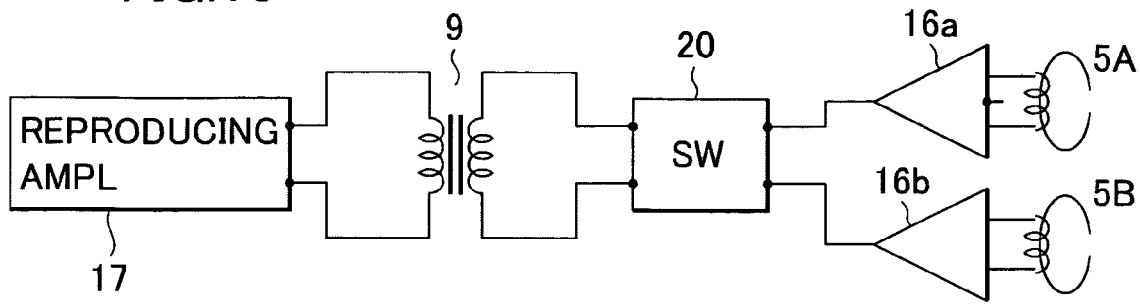
FIG. 10 is a block circuit diagram showing an outline of a conventional reproducing portion.
Figure 11:
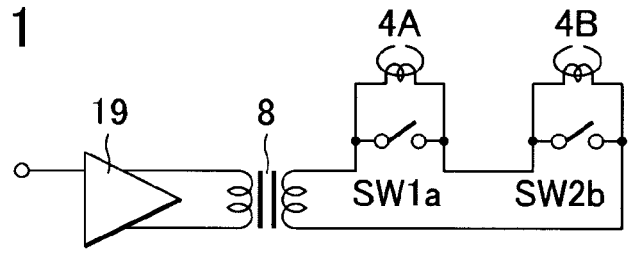
FIG. 11 is a block circuit diagram showing an outline of a conventional recording portion.
Figure 12:
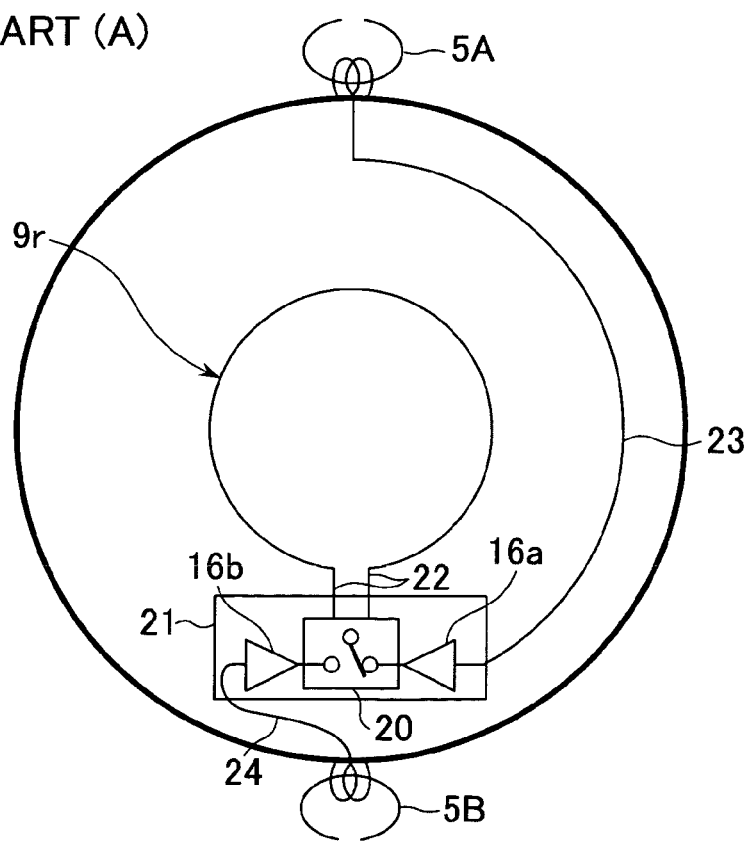
FIG. 12 is a wiring diagram showing an outline of a reproducing portion of on a rotor side of a conventional drum (A)
Figure 13:
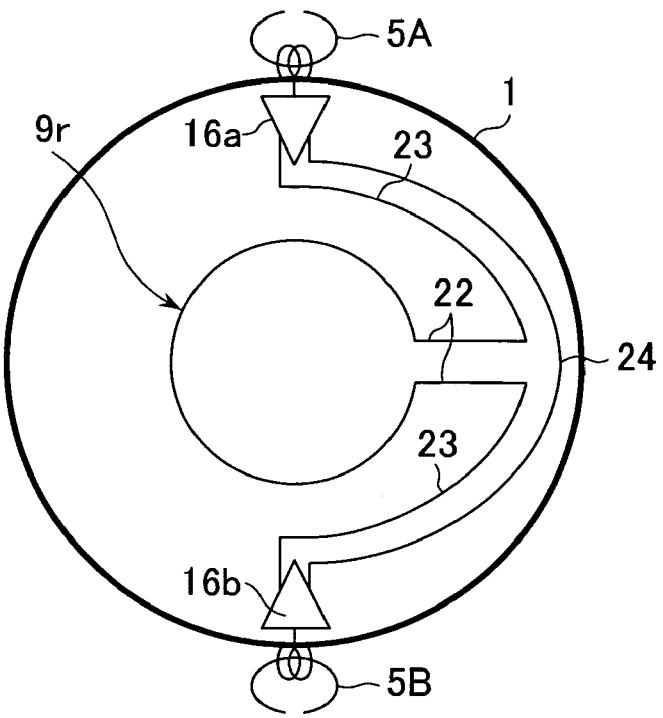
FIG. 13 is a wiring diagram showing an outline of a reproducing portion on a rotor side of a conventional drum (B)
Figure 14:
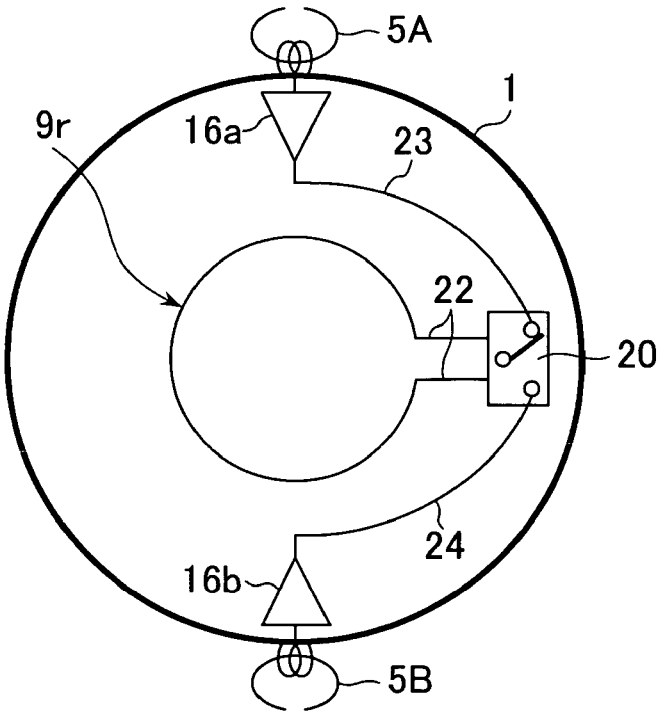
FIG. 14 is a wiring diagram showing an outline of a reproducing portion on a rotor side of a conventional drum (C).

Furthermore, when on resistances of the self short-circuit switches SW2a and SW2b of the head amplifiers 16a and 16b are 3 Ω and added to signals that are transferred, although cutoff in a low range rises from 350 kHz to 500 kHz, the frequency characteristic in the high frequency range as signal transfer characteristic of the rotary transformer 7 is not affected as shown in FIG. 7.

The switching timings of the foregoing switches may be multiplexed with the power signal to be transferred.

According to the foregoing embodiment, the rotor side windings 8r and 9r of the rotary transformer 7 are divided into two half turn portions per turn. However, the number of turns of the windings of the rotary transformer depends on for example signal transfer frequency and so forth. Thus, the number of turns is not limited to one turn. In addition, the two positions of lead wires of the rotary transformer are different by around 180°. Alternatively, the two positions of the lead wires of the rotary transformer may be different by other than 180° as long as wirings for connecting the lead wires and heads can be omitted. In addition, more than two heads may be switched. For example, heads that are not used at the same time may be connected and selectively used so that the rotary head drum apparatus can be used for different formats. In addition, according to the foregoing embodiment, a power is supplied using a rotary transformer, to a rectifying and smoothening circuit, and so forth. Alternatively, a DC power may be supplied using a slip ring. The reproducing heads may be MR devices or the like.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A rotary head drum apparatus, comprising:
    a rotary drum having a stator side and a rotor side;
    at least two heads oppositely disposed at two positions different by 180° on a rotary drum;
    a switch positioned on the rotor side of the rotary drum and connected to said heads for selecting one of said heads thereby forming a circuit with the selected head and short-circuiting another head of said heads based on a rotation position of the rotary drum; and
    a rotary transformer of one channel for transferring signals of the selected head, wherein;
    said rotary transformer has a rotor side winding divided into two winding portions that are opposite to said two heads.

2. The rotary head drum apparatus as set forth in claim 1, wherein:
    said two heads are reproducing heads.

3. The rotary head drum apparatus as set forth in claim 2, further comprising:
    two recording heads, wherein:
    said rotary transformer has another rotor side winding divided into two winding portions that are opposite to said two recording heads.

4. The rotary head drum apparatus as set forth in claim 1, wherein:
    said two heads are recording heads.

5. The rotary head drum apparatus as set forth in claim 1 comprising two switches positioned on the rotor side of the rotary drum.

6. The rotary head drum apparatus as set forth in claim 1, wherein the rotor side switch forms a circuit with one head and short-circuits another head when the rotary drum is rotated through an angle of about 180°.

7. A magnetic recording and/or reproducing apparatus of helical scan type for recording and/or reproducing signals, said magnetic recording and/or reproducing apparatus having a rotary head drum apparatus, comprising:
    a rotary drum having a stator side and a rotor side;
    two heads oppositely disposed at two positions different by 180° on the rotary drum;
    a switch positioned on the rotor side of the rotary drum and connected to said heads for selecting one of said two heads thereby forming a circuit with the selected head and short-circuiting another head of said heads based on a rotation position of the rotary drum; and a rotary transformer of one channel for transferring the signals of selected head, wherein:

said rotary transformer has a rotor side winding divided into two winding portions that are opposite to said two heads.

8. The magnetic recording and/or reproducing apparatus as set forth in claim 7, wherein;

said two heads of said rotary drum are reproducing heads.

9. The magnetic recording and/or reporducing apparatus as set forth in claim 8, further comprising:

two recording heads, wherein:

said rotary transformer has another rotor side winding divided into two winding portions that are opposite to said two recording heads.

10. The magnetic recording and/or reproducing apparatus as set forth in claim 7, wherein:

said two heads of said rotary drum are recording heads.

11. The rotary head drum apparatus as set forth in claim 1 having a ratio of rotary transformers and four heads 1:2.

12. The rotary head drum apparatus as set forth in claim 11 comprising two rotary transformers rotary transformers and four heads.

13. The magnetic recording and/or reproducing apparatus as set forth in claim 7 having a ratio of rotary transformers to heads of 1:2.

14. The magnetic recording and/or reproducing apparatus as set forth in claim 13 comprising two rotary transformers and four heads.

15. The magnetic recording and/or reproducing apparatus as set forth in claim 14 comprising two switches positioned on the rotor side of the rotary drum.

16. The magnetic recording an/or reproducing apparatus as set forth in claim 7, wherein the rotor side switch forms a circuit with one head and short-circuits another head when the rotary drum is rotated through an angle of about 180°.

* * * * *